United States Patent [19]
Berlioz et al.

[11] Patent Number: 5,952,570
[45] Date of Patent: Sep. 14, 1999

[54] HORIZONTAL SPEED INDICATOR FOR ROTARY-WING AIRCRAFT

[75] Inventors: Raymond Jacques Gérard Berlioz, Salon de Provence; Vincent Frédéric Saintagne, Velaux, both of France

[73] Assignee: Eurocopter, Cedex, France

[21] Appl. No.: 08/879,365

[22] Filed: Jun. 20, 1997

[30] Foreign Application Priority Data

Jun. 21, 1996 [FR] France .................................. 96 07739

[51] Int. Cl.$^6$ .............................. G01C 21/00; G01D 7/00
[52] U.S. Cl. ....................... 73/178 H; 73/178 T; 116/37; 116/DIG. 43; 33/351
[58] Field of Search ............................. 73/178 H, 178 R, 73/178 T; 116/37, 38, DIG. 43, 35 A; 33/351, 352, 328, 329, 330

[56] References Cited

U.S. PATENT DOCUMENTS

| | | | |
|---|---|---|---|
| 3,048,836 | 8/1962 | Guarino et al. | 73/178 H |
| 4,044,709 | 8/1977 | Green | 73/178 H |
| 4,170,132 | 10/1979 | Serley | 73/178 T |
| 4,297,673 | 10/1981 | Green | 116/DIG. 43 |
| 4,326,189 | 4/1982 | Crane | 73/178 R |

FOREIGN PATENT DOCUMENTS 2535493  3/1976  Germany.

OTHER PUBLICATIONS

Sheldon, et al. "The IntraFormation Positioning System," Conf. on Enhanced and Synthetic Vision Apr. 8–10, 1996, Orlando, FL, US; SPIE–Int'l Society for Optical Engineering, vol. 2736, 1996, pp. 176–182.

*Primary Examiner*—Hezron Williams
*Assistant Examiner*—Helen C. Kwok
*Attorney, Agent, or Firm*—Stevens, Davis, Miller & Mosher, L.L.P.

[57] ABSTRACT

A horizontal speed indicator for a rotary-wing aircraft includes first and second sensors for determining, respectively, the heading and the horizontal speed of the aircraft. The indicator processes the signals delivered by the first and second sensors, and displays the processed signals on a screen, which includes a compass rose which can rotate when the aircraft alters its heading, and a scale which represents the horizontal speed of the aircraft. The scale includes cross wires and concentric circles, and is capable of moving with respect to the compass rose.

8 Claims, 2 Drawing Sheets

HORIZONTAL SPEED INDICATOR FOR ROTARY-WING AIRCRAFT

BACKGROUND OF THE INVENTION

The present invention relates to a horizontal speed indicator for a rotary-wing aircraft, especially a helicopter, used when the aircraft is moving in all directions.

Such indicators are generally intended to equip search and rescue helicopters for hovering flight especially above the sea or alternatively for antisubmarine warfare. For this reason, by extension, they will also be known hereinafter as "hovering flight indicators".

Hitherto, hovering flight indicators have usually been of the electromechanical type. These indicators display the speed with respect to the ground (more succinctly known as the groundspeed), or horizontal speed, measured for example using a Doppler-effect radar. This speed is resolved along the X—X axis and Y—Y axis of the helicopter (where X—X represents the longitudinal axis of the aircraft and Y—Y is orthogonal to X—X) and its components Vx, Vy are each represented by a pointer, the two points forming a sort of cross wire (two pointers or wires intersecting at right angles).

However, such indicators already have a drawback insofar as the information they display can be interpreted in two ways. This is because in a conventional indicator marked with a cross at its center and where the vertical pointer (wire) moves laterally to indicate a lateral speed and the horizontal pointer indicates a longitudinal speed:

either the intersection of the pointers marks the end of the groundspeed vector, while the center of the indicator marks the origin of the vector (or the helicopter);

or, conversely, the intersection of the pointers represents the zero reference of the groundspeed.

So-called screen indicators of this type are also known, and they also use the above principle but can represent the current groundspeed in the form of a vector rather than using intersecting pointers. In this case, the instrument also gives a representation of space and can display the objective to be reached (ship in distress or shipwrecked for example). For this, stationary concentric marks centered on a central reference representing the helicopter indicate both distances and speed magnitudes.

Furthermore, the logic involved in providing on-screen displays tends to deviate from that employed in conventional indicators. This is because circular representations are, on the one hand, very cumbersome for transmitting to a screen and, on the other hand, because the movement of a reference point along a stationary scale is not consistent with one's perception of one's surroundings (in this sense, the altimeter for example is organized in a way which goes against that of the artificial horizon which has the advantage of instinctive analogy). For this reason it is difficult for an indicator of the above type to be integrated into an organization consistent with that of the artificial horizon where the vehicle is represented as stationary (for the pilot) in moving surroundings.

Furthermore, it would seem that for this last type of indicator, for reasons associated with the way in which it is determined, the current speed displayed always has a lag. Furthermore, with fixed scales, the fields of distance and of speed that can be displayed remain limited.

SUMMARY OF THE INVENTION

The object of the present invention is to avoid these drawbacks.

To achieve this, the horizontal speed indicator for a rotary-wing aircraft, especially a helicopter, used when the aircraft is moving in all directions, is noteworthy, according to the invention, in that it comprises:

a first sensor and a second sensor for the heading and the horizontal speed of the aircraft, respectively, means of processing the signals delivered by said first sensor and said second sensor, and means of displaying the processed signals, showing on a display screen:

a symbol representing the position of the aircraft, the extensions of which symbol denote the longitudinal axis X—X and transverse axis Y—Y of the aircraft, a compass rose which can rotate when the aircraft alters its heading, a scale which represents the horizontal speed of the aircraft, the scale consisting of cross wires and of concentric circles each of which represents a given value of horizontal speed and which is capable of moving with respect to the compass rose, the travel of said scale in the window formed by the compass rose, with the axes X—X and Y—Y and the axes of said cross wires remaining respectively parallel, showing the current horizontal speed of the aircraft at each moment.

Thus such a display makes it possible to guarantee complete consistency with the other indicators on the control panel, especially the artificial horizon. Furthermore, there is no limitation imposed on the field of groundspeeds, particularly as regards the speed Vx along the longitudinal axis of the aircraft.

In particular, said symbol representing the position of the aircraft may be a thick cross.

Advantageously, the indicator according to the invention additionally displays on the display screen a demanded-speed symbol, which may be a thin cross, representing the longitudinal and lateral speed reference values Vx and Vy. This symbol thus represents, in advance, the objective which is to be reached and avoids a succession of progressive adjustments.

The window of the compass rose preferably represents a flat circular space of adjustable radius, where the calculated position of an objective to be reached by the aircraft, or the direction in which said objective lies, can be represented.

Furthermore, the field of omnidirectional speed and/or a symbol representing the strength and direction of the wind may be displayed on the display screen.

BRIEF DESCRIPTION OF THE DRAWINGS

The figures of the appended drawing will make it easy to understand how the invention may be embodied. In these figures, identical references denote similar elements.

DETAILED DESCRIPTION OF THE PREFERRED EMBODIMENTS

Figure 1:
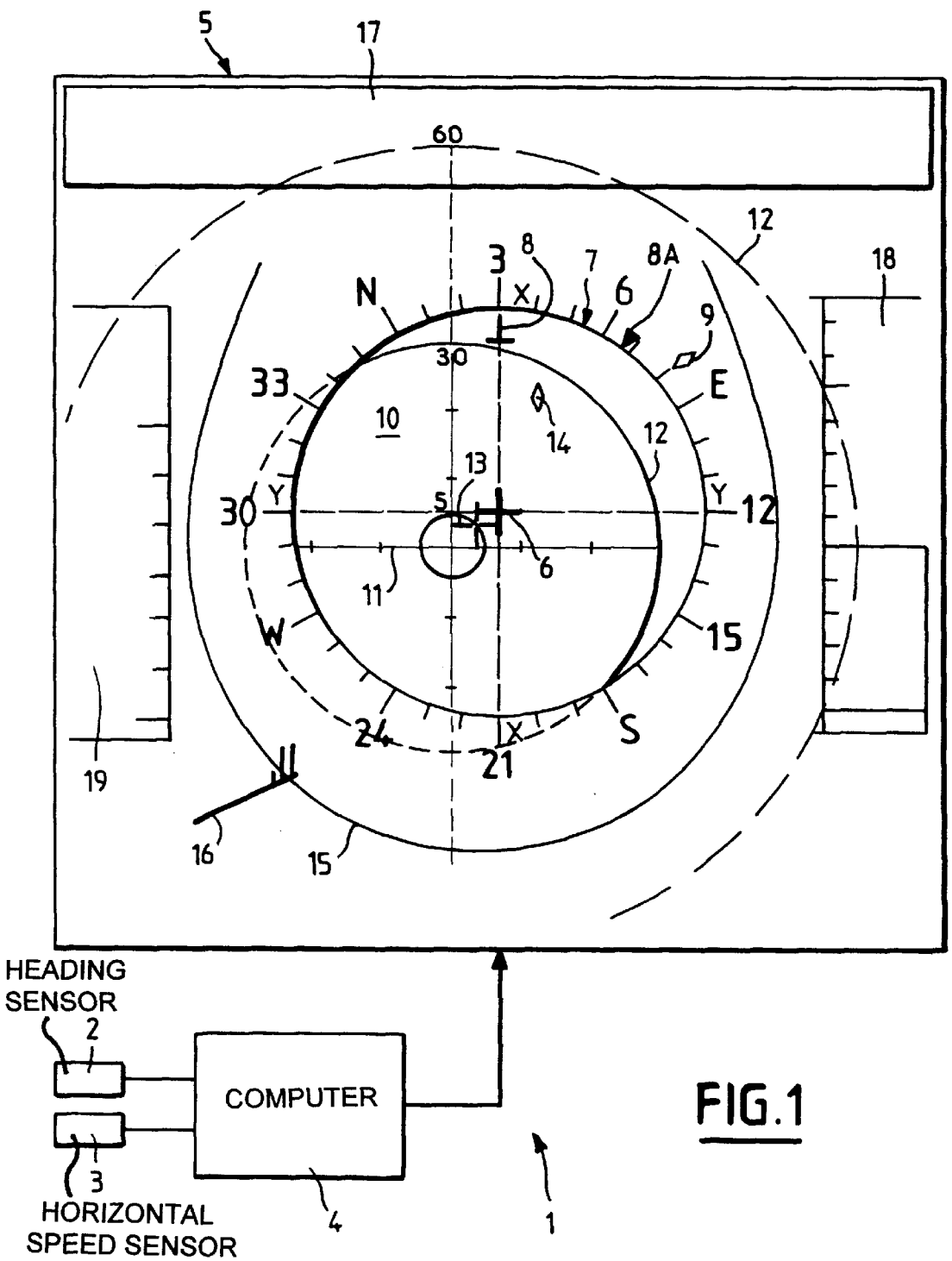
FIG. 1 is a diagrammatic representation of the aircraft horizontal speed indicator according to the invention, showing an example of a layout of the display screen of the indicator on an aircraft control panel screen.

FIG. 1 shows the aircraft horizontal speed indicator 1 according to the invention.

The indicator 1 comprises various sensors, in particular, as shown, the heading sensor 2 and the horizontal speed sensor 3, especially a Doppler-effect radar. These sensors 2, 3 deliver their information to a computer 4 which may be integrated into the aircraft navigation computer which allows the various processed items of information to be displayed on a display screen 5, this being achieved through the use of a symbol generator (not represented).

More specifically, the various aforementioned information items are displayed on the display screen 5 with the aid of:

- a symbol representing the position of the aircraft, advantageously a thick cross 6 (the extensions of which denote the longitudinal axis X—X and transverse axis Y—Y of the aircraft),
- a compass rose 7 which can rotate when the aircraft alters its heading [it will be noted that in FIG. 1 the current heading 8 (30°) is denoted by an inverted T, while the axis of the trajectory (route actually followed) with groundspeed and windspeed taken into account, is denoted by a diamond 9],
- a scale 10 representing the horizontal speed of the aircraft consisting of cross wires 11 (in this context, the term "crosswires" denotes two axes intersecting at right angles) and of concentric circles 12 each of which represents a given horizontal speed value (for example, as shown, 5, 30 and 60 knots) and which can move with respect to the compass rose 7, the travel of the speed scale 10 in the window formed by the compass rose, with the X—X axis and Y—Y axis and the axes of the crosswires 11 remaining respectively parallel, showing the current horizontal speed of the aircraft at each moment, in terms of value and in terms of "bearing". In addition, in FIG. 1, the demanded heading is denoted 8A.

Furthermore, a demanded-speed symbol 13 (represented by way of example by a thin cross in FIG. 1 and by a circle in FIGS. 2 and 3) is displayed on the display screen 5.

The demanded-speed symbol gives the pilot advanced indications and very greatly reduces his workload. It represents the speed reference values Vx and Vy. This may be a circle, a luminous spot or any other appropriate indication which travels across the groundspeed scale. The pilot thus instantaneously can see the reference value given, that the automatic pilot will eventually stabilize. Permanent monitoring is no longer necessary, and commands can be corrected slightly, making a visual check, still instantaneously, of what is commanded.

For completeness, it is emphasized that the Doppler-effect radar (current speed) measures frequency changes. The signals emitted are modulated as a function of the reflections by the forward, rear, etc. speed. The frequency variations received are converted into terms of speed. Where the ground is uneven, especially if there are waves, a lag in groundspeed occurs.

Thus when the pilot acts on the automatic pilot by operating a wheel, the aircraft accelerates, if that corresponds to the command given, and depending on the aforementioned lag, the pilot adjusts upward or downward to achieve the desired speed, which takes a few seconds. This is because on a conventional indicator the pilot cannot see the demanded speed and because there is a delay in indicating the groundspeed. Displaying the demanded-speed symbol as described above, makes it possible to eliminate this drawback.

The horizontal speed indicator according to the invention, as can be seen in FIG. 1, therefore comprises a compass rose 7 that the operator can consider as being a window in the horizontal plane through which he can see the groundspeed scale 10 move as a function of commands given to the aircraft. For example, if the aircraft is moving forward and to the right, the groundspeed scale will move backward (toward the bottom of the figure) and to the left.

Furthermore, the compass rose 7 represents a flat circular space the radius of which can be chosen by the operator (for example one nautical mile) and in which the calculated position of the objective, here represented by a diamond 14 can be shown. It will be noted that this position is indicated to the navigation computer 4 either by its coordinates, referenced, for example, using a beacon, or by the aircraft overflying the objective. The objective thus remains displayed while the aircraft maneuvers to return to hover over the objective or approach the latter without having it directly in sight.

Furthermore, as shown, the field of omnidirectional speed 15 (airspeed) can be displayed, together with a symbol representing the strength and direction of the wind 16, in order to avoid displaying excessively high non-axial speeds. This is because the pilot has to comply with strict crosswind and tailwind speed limits. As the instrument measures only groundspeeds, it is accurate only for zero windspeeds, or, for crosswinds, with the condition that the wind is axial. Furthermore, in the presence of a headwind, the pilot may underestimate the backward speed possibilities. The field of airspeed is determined by trials. For the indicator, the center of its line experiences a translational movement which corresponds to the current wind condition from the zero reference of the groundspeed scale.

Moreover, various fields on the display screen 5 may be reserved for displaying various items of information relating especially to aircraft navigation.

Thus on the strip 17, the following information may be displayed, with navigation source known as A.NAV:

- the desired route or course,
- the bearing of the next marker,
- the estimated time to arrive at this marker,
- the estimated distance to the marker,
- the speed of the aircraft, estimated by the navigation computer with respect to information received from the marker.

Furthermore, the altimeter 18 may be displayed to the right of the compass rose 7 in FIG. 1, the information including the cruising speed altitude that the aircraft has to arrive at, the current altitude of the aircraft, and the decision altitude on approaching which the pilot has to take a certain action, for example lowers the landing gear, and any indicator 19 used in navigation may also be displayed to the left of the compass rose 7.

Figure 2:
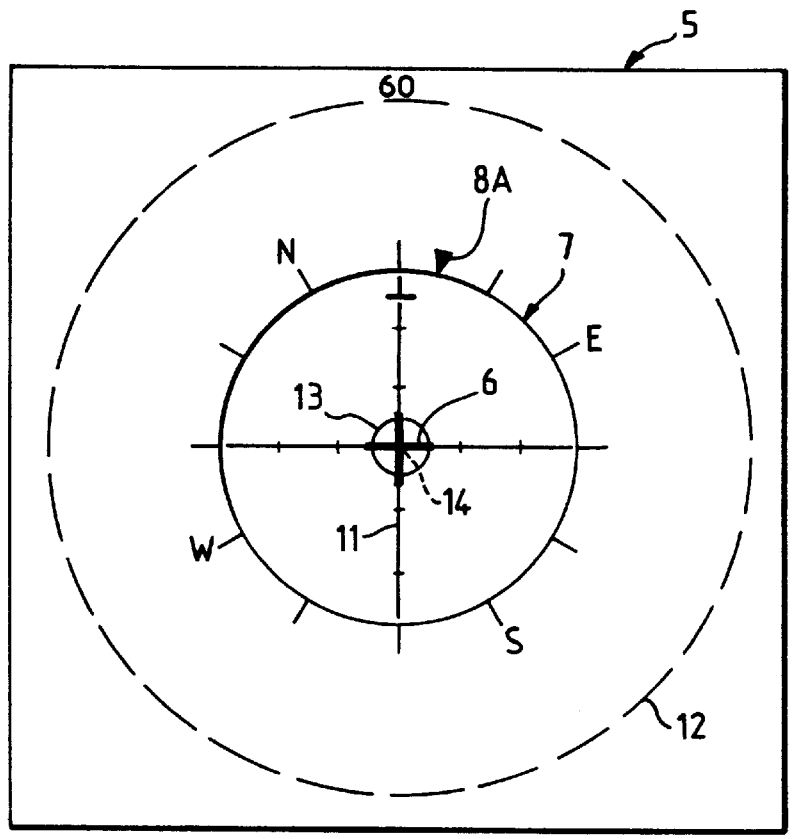
FIG. 2 shows the indicator display screen when the aircraft is in hovering flight.

It will furthermore be noted that FIG. 2 illustrates the display screen 5 when the aircraft is in hovering flight (zero horizontal speed) above the objective 14.

Figure 3:
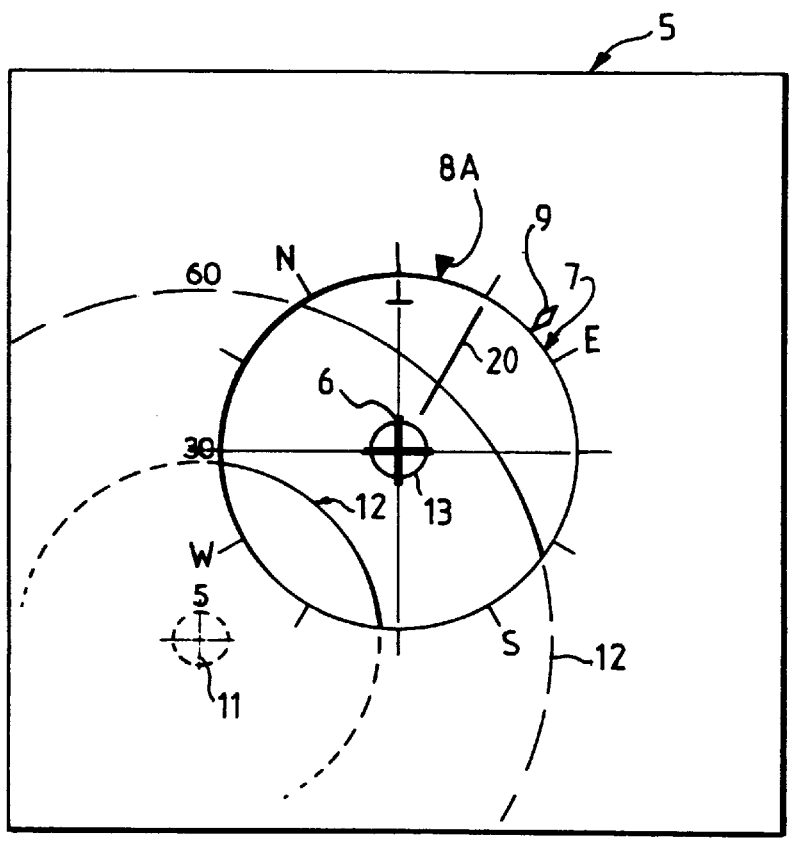
FIG. 3 shows the indicator display screen for an aircraft moving at a (relatively) high horizontal speed.

FIG. 3 for its part shows the display screen 5 for an aircraft moving at a (relatively) high horizontal speed (in this example, of the order of 48 knots) and this horizontal speed is, in this case, equal to the demanded speed (the thick cross 6 and thin cross 13 are superimposed). In this figure, it has been assumed that the objective was outside the window of the compass rose: but the direction in which it lies is still indicated as 20.

Comparing FIGS. 1 to 3 clearly shows the "travel" of the groundspeed scale as the horizontal speed of the aircraft varies.

Thanks to such an on-screen display, the indicator of the invention allows full consistency with the other control panel indicators, especially including the artificial horizon, for which instruments the vehicle (aircraft) is shown stationary in moving surroundings, with scales that can move past a stationary reference point, which is consistent with the pilot's natural perception. Furthermore, the design of the indicator makes it possible to make the two "schools of flying" cited in the introduction, namely flying using groundspeeds and flying with groundspeed zero reference, tally.

What is more, by contrast with conventional indicators, which allow groundspeeds to be displayed only between 0 and approximately 30 knots (higher than this the indicator remains against the limit stop), the indicator according to the invertion imposes no limit on the field of groundspeeds displayed, particularly as regards the speed Vx along the longitudinal axis of the aircraft, for which the limits in forward translational flight are naturally far higher than those for backward or lateral speeds (Vy).

What is claimed is:

1. A horizontal speed indicator for a rotary-wing aircraft, especially a helicopter, used when the aircraft is moving in all directions, this indicator comprising:

a first sensor and a second sensor for the heading and the horizontal speed of the aircraft, respectively, means of processing signals delivered by said first sensor and said second sensor, and means of displaying the processed signals, showing on a display screen:

a symbol representing a position of the aircraft, the extensions of which symbol denote the longitudinal axis (X—X) and transverse axis (Y—Y) of the aircraft, a compass rose which can rotate when the aircraft alters its heading, a scale which represents a horizontal speed of the aircraft, the scale consisting of cross wires and of concentric circles each of which represents a given value of horizontal speed and which is capable of moving with respect to the compass rose, the travel of said scale in a window formed by the compass rose, with the axes (X—X) and (Y—Y) and axes of said cross wires remaining respectively parallel, showing a current horizontal speed of the aircraft at each moment.

2. The indicator as claimed in claim 1, wherein said symbol representing the position of the aircraft is a thick cross.

3. The indicator as claimed in claim 1, wherein a demanded-speed symbol representing longitudinal and lateral speed reference values (Vx and Vy) is displayed on the display screen.

4. The indicator as claimed in claim 3, wherein said demanded-speed symbol is a thin cross.

5. The indicator as claimed in claim 1, wherein the window in the compass rose represents a flat circular space of adjustable radius, where a calculated position of an objective to be reached by the aircraft can be represented.

6. The indicator as claimed in claim 5, wherein the direction of the objective is displayed in the window of the compass rose.

7. The indicator as claimed in claim 1, wherein a field of omnidirectional speed is displayed on the display screen.

8. The indicator as claimed in claim 7, wherein a symbol representing the strength and direction of the wind is displayed.

* * * * *